United States Patent
Luo et al.

(10) Patent No.: US 11,243,648 B2
(45) Date of Patent: Feb. 8, 2022

(54) TOUCH PANEL, ARRAY SUBSTRATE AND DISPLAY DEVICE

(71) Applicants: BEIJING BOE OPTOELECTRONICS TECHNOLOGY CO., LTD, Beijing (CN); BOE TECHNOLOGY GROUP CO., LTD., Beijing (CN)

(72) Inventors: Xingyou Luo, Beijing (CN); Yue Li, Beijing (CN); Xi Chen, Beijing (CN); Yanchen Li, Beijing (CN); Jinyu Li, Beijing (CN); Dawei Feng, Beijing (CN); Yu Zhao, Beijing (CN); Shaojun Hou, Beijing (CN); Dong Wang, Beijing (CN); Mingyang Lv, Beijing (CN); Wang Guo, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 697 days.

(21) Appl. No.: 16/079,612

(22) PCT Filed: Feb. 12, 2018

(86) PCT No.: PCT/CN2018/076488
§ 371 (c)(1),
(2) Date: Aug. 24, 2018

(87) PCT Pub. No.: WO2019/007078
PCT Pub. Date: Jan. 10, 2019

(65) Prior Publication Data
US 2021/0191544 A1    Jun. 24, 2021

(30) Foreign Application Priority Data
Jul. 4, 2017    (CN) .......................... 201710539146.7

(51) Int. Cl.
*G06F 3/044*    (2006.01)
*G06F 3/041*    (2006.01)

(52) U.S. Cl.
CPC .......... *G06F 3/0446* (2019.05); *G06F 3/0412* (2013.01); *G06F 3/0416* (2013.01); *G06F 3/0448* (2019.05); *G06F 3/04164* (2019.05)

(58) Field of Classification Search
CPC ... G06F 3/0412; G06F 3/04164; G06F 3/0448
(Continued)

(56) References Cited

U.S. PATENT DOCUMENTS 4,380,040 A * 4/1983 Posset .................. H03K 17/962
                                                            200/600
2017/0060313 A1 * 3/2017 Kim ...................... G06F 3/0412

FOREIGN PATENT DOCUMENTS

CN    104137042 A    11/2014
CN    104142757 A    11/2014
(Continued)

OTHER PUBLICATIONS

International Search Report dated Apr. 26, 2018 corresponding to application No. PCT/CN2018/076488.
(Continued)

*Primary Examiner* — Mark Edwards
(74) *Attorney, Agent, or Firm* — Nath, Goldberg & Meyer; Joshua B. Goldberg

(57) ABSTRACT

The present disclosure provides a touch panel, an array substrate and a display device. The touch panel includes a touch control electrode unit including a first electrode and a second electrode which are insulated from each other, and the second electrode surrounds the first electrode. In the touch panel in which the second electrode surrounds the first electrode in the touch control electrode unit, since the first electrode and the second electrode are provided indepen-
(Continued)

dently, touch control driving and sensing are performed on the first electrode and the second electrode respectively when the touch panel is being touched.

6 Claims, 6 Drawing Sheets

(58) Field of Classification Search
USPC .......................................................... 345/174
See application file for complete search history.

(56) References Cited

FOREIGN PATENT DOCUMENTS

| | | | |
|---|---|---|---|
| CN | 104808404 A | | 7/2015 |
| CN | 104820532 A | * | 8/2015 |
| CN | 104820532 A | | 8/2015 |
| CN | 105867712 A | | 8/2016 |
| CN | 106527820 A | | 3/2017 |
| CN | 106783873 A | | 5/2017 |
| CN | 107329622 A | | 11/2017 |
| JP | 2013246695 A | | 12/2013 |
| TW | 201606611 A | | 2/2016 |

OTHER PUBLICATIONS

Office Action dated Mar. 20, 2019 issued in corresponding Chinese Application No. 201710539146.7.
First Office Action dated Jun. 3, 2021 for application No. JP 2019-562611 with English translation attached.

* cited by examiner

TOUCH PANEL, ARRAY SUBSTRATE AND DISPLAY DEVICE

CROSS-REFERENCE TO RELATED APPLICATION

This is a National Phase Application filed under 35 U.S.C. 371 as a national stage of PCT/CN2018/076488, filed Feb. 12, 2018, an application claiming the benefit from the Chinese patent Application No. 201710539146.7, filed Jul. 4, 2017 the content of each of which is hereby incorporated by reference in its entirety.

TECHNICAL FIELD

The present disclosure relates to the field of touch control display technology, in particular, to a touch panel, an array substrate and a display device.

BACKGROUND

Touch screens may be classified into resistive touch screens, capacitive touch screens, surface acoustic wave touch screens, infrared touch screens, and so on, according to the principles of the touch screens. Currently, the capacitive touch control technology is applied widely. The capacitive touch control technology includes mutual-capacitance touch control and self-capacitance touch control. The principle of the mutual-capacitance touch screen is as follows: touch control detection voltage signals are applied to touch control sensing electrodes (lines) through touch control driving electrodes (lines), and the occurrence of a touch control event and the position where the touch control event occurs are determined by receiving the voltage signals fed back by the touch control sensing electrodes (lines).

SUMMARY

According to an aspect of the present disclosure, there is provided a touch panel including a touch control electrode unit including a first electrode and a second electrode which are insulated from each other, wherein the second electrode surrounds the first electrode.

Optionally, the first electrode has a rectangular shape, and the second electrode has a rectangular ring shape.

Optionally, the first electrode has a square shape, the second electrode has a square ring shape, and a distance between an inner ring and an outer ring of the square ring shape is uniform; a side length of the square shape of the first electrode is two times of the distance between the inner ring and the outer ring of the square ring shape of the second electrode.

Optionally, the first electrode has a cruciform shape, the second electrode has a ring shape matched with the cruciform shape of the first electrode, and an inner ring of the ring shape has a cruciform shape and an outer ring of the ring shape has a rectangular shape.

Optionally, the first electrode has a circular shape, the second electrode has a ring shape matched with the circular shape of the first electrode, and an inner ring of the ring shape has a circular shape and an outer ring of the ring shape has a rectangular shape.

Optionally, a gap between the first electrode and the second electrode has a width of 3 µm to 5 µm.

Optionally, the touch panel includes a plurality of touch control electrode units which are arranged in an array.

Optionally, a gap between two adjacent touch control electrode units has a width of 3 µm to 5 µm.

Optionally, the first electrode is a driving electrode, and the second electrode is a sensing electrode; or alternatively, the first electrode is a sensing electrode, and the second electrode is a driving electrode.

Optionally, the touch panel further includes a touch control driving circuit, each driving electrode is connected to a corresponding driving signal line, each sensing electrode is connected to a corresponding sensing signal line, the driving signal line and the sensing signal line are connected to the touch control driving circuit, respectively, and the touch control driving circuit outputs a touch control driving signal to the driving electrode through the driving signal line, and receives a touch control sensing signal fed back by the sensing electrode through the sensing signal line.

According to another aspect of the present disclosure, there is provided an array substrate including the above touch panel.

Optionally, the array substrate further includes pixel electrodes and a common electrode, the pixel electrodes being located above or below the common electrode; the first electrode and the second electrode of the touch panel also serve as the common electrode.

Optionally, the array substrate further includes a first switch transistor, a second switch transistor, a first gate line, a second gate line, a data line and a common signal line. The first switch transistor is used for driving the pixel electrodes in odd numbers in one row of pixel electrodes to display; the second switch transistor is used for driving the pixel electrodes in even numbers in one row of pixel electrodes to display; the first gate line is connected to a gate of the first switch transistor; the second gate line is connected to a gate of the second switch transistor; one data line is provided every two columns of pixel electrodes, two adjacent columns of pixel electrodes which are provided with a data line therebetween are connected to this data line through the first switch transistor and the second switch transistor connected respectively thereto; the common signal line is provided between two adjacent columns of pixel electrodes which are not provided with a data line therebetween, the common signal line and the data line are formed in a same layer by using a same material, and the common signal line is connected to the common electrode through a via provided in an insulation layer located between the data line and the common electrode; and the common signal line serves as the common electrode during display, and serves as a driving signal line and a sensing signal line of the touch panel during touch control.

Optionally, the array substrate includes a plurality of common signal lines, each of the plurality of first electrodes located in different rows and also serving as the common electrode is connected to a corresponding common signal line; and each of the plurality of second electrodes located in different rows and also serving as the common electrode is connected to a corresponding common signal line.

Optionally, the array substrate includes a plurality of common signal lines, each of a plurality of first electrodes located in different rows and also serving as the common electrode is connected to a corresponding common signal line among the plurality of common signal lines connected in parallel; and each of a plurality of second electrodes located in different rows and also serving as the common electrode is connected to a corresponding common signal line among the plurality of common signal lines connected in parallel.

According to an aspect of the present disclosure, there is provided a display device including the above array substrate.

DETAILED DESCRIPTION

A touch panel, an array substrate and a display device provided by the present disclosure will be described in detail below in conjunction with the drawings and specific implementations in order that a person skilled in the art can understand the technical solutions of the present disclosure better.

At present, the touch control driving electrodes and the touch control sensing electrodes are generally disposed as driving electrode strings and sensing electrode strings which intersect with each other. Capacitors are formed at intersections of the driving electrode strings and the sensing electrode strings; that is, the driving electrode strings and the sensing electrode strings constitute two electrodes of the capacitors, respectively. When a finger touches the capacitive touch screen, the coupling between the two electrode strings near the touch point is affected, and thus the capacitance between the two electrode strings is changed. In the case that a mutual capacitance is detected, the driving electrode strings which are laterally arranged transmit an exciting signal in turn while the sensing electrode strings which are longitudinally arranged receive an sensing signal simultaneously, and thereby the capacitance values at the intersections of all the lateral and longitudinal electrode strings, or, the capacitance of the two-dimensional plane of the whole touch screen, may be obtained; according to the data regarding the variation in the two-dimensional capacitance of the touch screen, the coordinates of each touch point may be calculated.

Since each driving electrode string is connected to a touch control driving chip through a driving signal line, and each sensing electrode string is connected to the touch control driving chip through a sensing signal line, there is a high coupling capacitance between the whole driving or sensing electrode string and a metal film adjacent thereto on the display panel, which causes a high impedance of a channel connecting the touch control driving chip to the driving or sensing signal line. With such a design of the driving electrodes and sensing electrodes which are respectively connected into strings laterally or longitudinally, since the impedances of driving and sensing channels are high, both the sensitivity and the signal to noise ratio of the touch screen are low.

Therefore, how to improve the sensitivity and the signal to noise ratio of the touch screen becomes a problem to be settled urgently.

Figure 1:
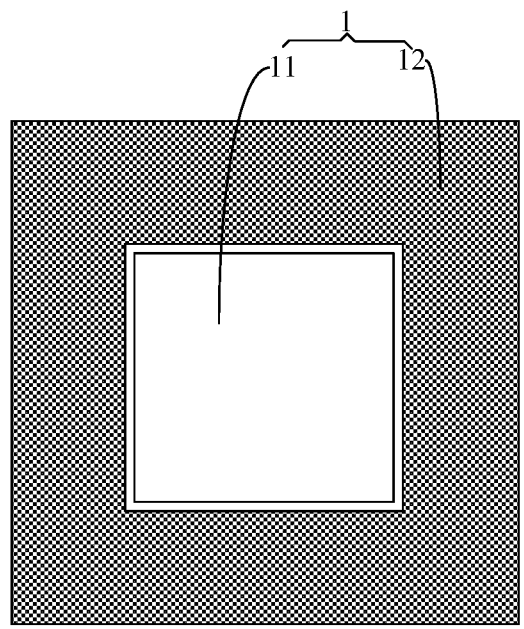
FIG. 1 is a top view of a structure of a touch control electrode unit on a touch panel in an embodiment of the present disclosure.

The present embodiment provides a touch panel, which includes, as shown in FIG. 1, a touch control electrode unit 1. The touch control electrode unit 1 includes a first electrode 11 and a second electrode 12 which are insulated from each other. The second electrode 12 surrounds the first electrode 11.

By making the second electrode 12 surround the first electrode 11 in the touch control electrode unit 1, since the first electrode 11 and the second electrode 12 are provided independently, touch control driving is performed on the first electrode 11 and the second electrode 12 respectively when the touch panel is being touched; compared with the existing design of a touch panel in which a plurality of driving electrodes are connected to form a driving electrode string and a plurality of sensing electrodes are connected to form a sensing electrode string, the impedance at the time of driving and sensing the first electrodes 11 and the second electrodes 12 in the touch panel is decreased, thereby improving the sensitivity and the signal to noise ratio of the touch panel.

In the present embodiment, the first electrode 11 has a rectangular shape, and the second electrode 12 has a rectangular ring shape. The rectangular ring shape of the second electrode 12 surrounds the rectangular shape of the first electrode 11. The first electrode 11 is a driving electrode, and the second electrode 12 is a sensing electrode. With such a configuration, the driving electrode is located at the center of the sensing electrode, whereby the sensing electrode the driving electrode can perform sensing on the touch of a user to the full extent, and the touch control sensitivity of the touch control electrode unit 1 can be improved. Moreover, such configuration has a simple structure, a simplified process and a convenient manufacturing procedure.

Optionally, a gap between the first electrode 11 and the second electrode 12 has a width of 3 μm to 5 μm. Such a gap width may enable the touch control electrode unit 1 to sense the touch control of a finger responsively and with high accuracy.

In an embodiment, the first electrode 11 has a square shape, the second electrode 12 has a square ring shape, and a distance between an inner ring and an outer ring of the square ring shape is uniform; a side length of the square shape of the first electrode 11 is two times of the distance between the inner ring and the outer ring of the square ring shape of the second electrode 12. In the present embodiment, the first electrode 11 is a driving electrode, and the second electrode 12 is a sensing electrode. With such a configuration, the driving electrode is located at the center of the sensing electrode, whereby the sensing electrode and the driving electrode can perform sensing on user's touch to the full extent, and the touch control sensitivity of the touch control electrode unit 1 can be improved.

Optionally, the gap between the first electrode 11 and the second electrode 12 has a width of 3 μm to 5 μm. Such a gap width may enable the touch control electrode unit 1 to sense the touch control of a finger responsively and with high accuracy.

In the present embodiment, there are a plurality of touch control electrode units 1 which are arranged in an array. That is, both the first electrodes 11 and the second electrodes 12 in the touch panel are arranged in an array. The configuration that the second electrodes 12 surround the first electrodes 11 can improve the touch control sensitivity and the signal to noise ratio of the whole touch panel, and has a simple structure, a simplified process and a convenient manufacturing procedure.

Optionally, a gap between two adjacent touch control electrode units 1 has a width of 3 μm to 5 μm. Such a gap width may enable the touch control electrode units 1 to sense the touch control of a finger responsively and with high accuracy.

In the present embodiment, the touch panel further includes a touch control driving circuit, each driving electrode is connected to a corresponding driving signal line, each sensing electrode is connected to a corresponding sensing signal line, and the driving signal line and the sensing signal line are connected to the touch control driving circuit, respectively. The touch control driving circuit outputs a touch control driving signal to the driving electrode through the driving signal line, and receives a touch control sensing signal fed back by the sensing electrode through the sensing signal line. Compared with the existing design of a touch panel in which a whole driving electrode string is connected to the touch control driving chip through a driving signal line and a whole sensing electrode string is connected to the touch control driving chip through a sensing signal line, such a configuration can reduce greatly the coupling capacitance between the driving and sensing electrodes and other metal films in the display panel, and thus lower the requirement for the impedances of the channels in the touch control driving circuit, thereby lowering the requirement for the driving capability of the channels connecting the driving electrodes and the sensing electrodes in the touch control driving circuit; meanwhile, compared with a touch panel using the principle of the self-capacitance touch control, the touch panel in the present embodiment can achieve multi-touch, and has no ghost point when the multi-touch is performed.

The touch control principle of the touch panel in the present embodiment is as follows: after being electrified, the driving electrode and the sensing electrode have a mutual capacitor formed therebetween; when a touch control driving voltage signal is transmitted to a corresponding driving electrode through the driving signal line, due to the coupling effect of the capacitor, the sensing electrode in the periphery of the driving electrode may sense a corresponding voltage signal and feed it back to a receiving terminal (receiving channel) of the touch control driving circuit through a corresponding sensing signal line. When a finger is touching the touch panel, a distribution of a fringing electric field between the driving electrode and the sensing electrode may be changed, and thereby the feedback voltage signal sensed on the sensing electrode may be changed.

Figure 2A:
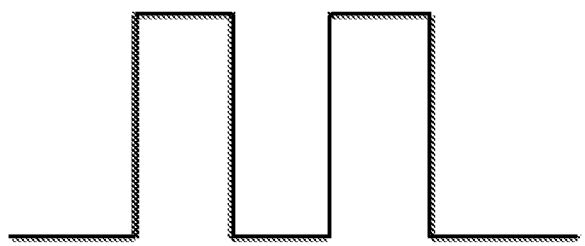
FIG. 2a is a waveform graph of a voltage signal when no feedback voltage signal is sensed on a sensing electrode in FIG. 1.
Figure 2B:
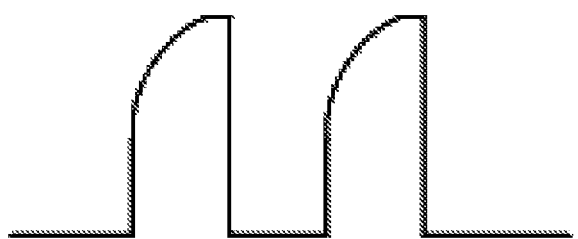
FIG. 2b is a waveform graph of a voltage signal when a feedback voltage signal is sensed on the sensing electrode in FIG. 1.

FIG. 2a is a waveform graph of a voltage signal when no feedback voltage signal is sensed on the sensing electrode; FIG. 2b is a waveform graph of a voltage signal when a feedback voltage signal is sensed on the sensing electrode. Based on the coordinates of the positions of the driving electrode and the sensing electrode, the specific touch position of the finger can be determined, thereby achieving the touch control of the touch panel.

It should be noted that the first electrode 11 may also be the sensing electrode and the second electrode 12 may also be the driving electrode. The configuration that the second electrode 12 surrounds the first electrode 11 can improve the sensitivity and the signal to noise ratio of the touch panel, and has a simple structure, a simplified process and a convenient manufacturing procedure.

Figure 3A:
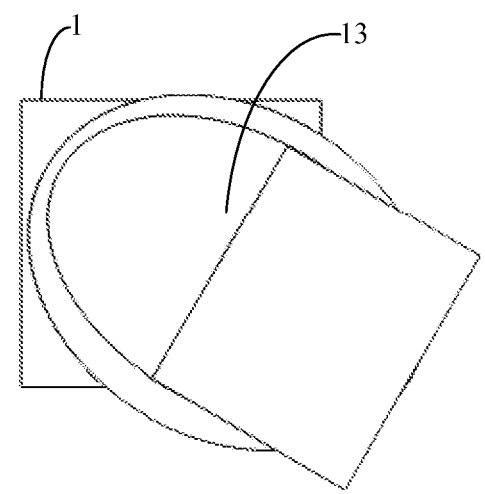
FIG. 3a is a schematic diagram illustrating that a touch position is right above a touch control electrode unit, when a touch panel in an embodiment of the present disclosure is being touched.

Based on the above structure of the touch panel in the present embodiment, when the touch panel is being touched, the touch control driving signals may be transmitted to respective driving electrodes through respective driving signal lines, and the touch control sensing signals fed back by respective sensing electrodes may be received simultaneously through respective sensing signal lines, thereby achieving the touch control of the whole touch panel. The touch control position(s) of a finger on the touch panel and the feedback signal(s) sensed by the sensing electrode(s) may have the following four cases:

1. In a case that the touch control driving circuit detects a touch control feedback signal only on the sensing electrode in the $i^{th}$ row and the $j^{th}$ column ($1 \le i \le m$, $1 \le j \le n$), the touch control position of the finger 13 is right above the touch control electrode unit 1 in the $i^{th}$ row and the $j^{th}$ column, as shown in FIG. 3a.

Figure 3B:
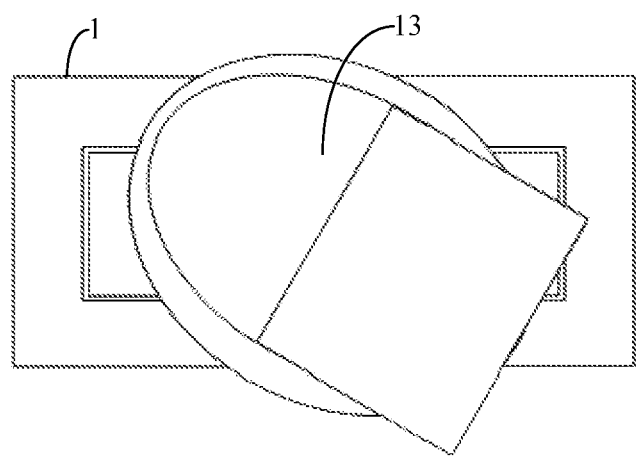
FIG. 3b is a schematic diagram illustrating that a touch position is between two touch control electrode units which are in a same row and in adjacent columns, when a touch panel in an embodiment of the present disclosure is being touched.

2. In a case that the touch control driving circuit detects touch control feedback signals on the sensing electrode in the $i^{th}$ row and the $(j-1)^{th}$ column ($1 \le i \le m$, $1 \le j \le n$), and on the sensing electrode in the $i^{th}$ row and the $j^{th}$ column ($1 \le i \le m$, $1 \le j \le n$), simultaneously, the touch control position of the finger 13 is between the touch control electrode unit 1 in the $i^{th}$ row and the $(j-1)^{th}$ column and the touch control electrode unit 1 in the $i^{th}$ row and the $j^{th}$ column, as shown in FIG. 3b.

Figure 3C:
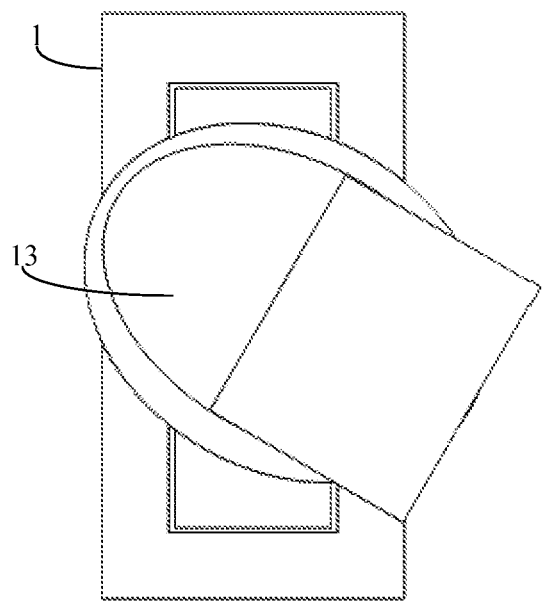
FIG. 3c is a schematic diagram illustrating that a touch position is between two touch control electrode units which are in a same column and in adjacent rows, when a touch panel in an embodiment of the present disclosure is being touched.

3. In a case that the touch control driving circuit detects touch control feedback signals on the sensing electrode in the $(i-1)^{th}$ row and the $j^{th}$ column ($1 \le i \le m$, $1 \le j \le n$), and on the sensing electrode in the $i^{th}$ row and the $j^{th}$ column ($1 \le i \le m$, $1 \le j \le n$), simultaneously, the touch control position of the finger 13 is between the touch control electrode unit 1 in the $(i-1)^{th}$ row and the $j^{th}$ column and the touch control electrode unit 1 in the $i^{th}$ row and the $j^{th}$ column, as shown in FIG. 3c.

Figure 3D:
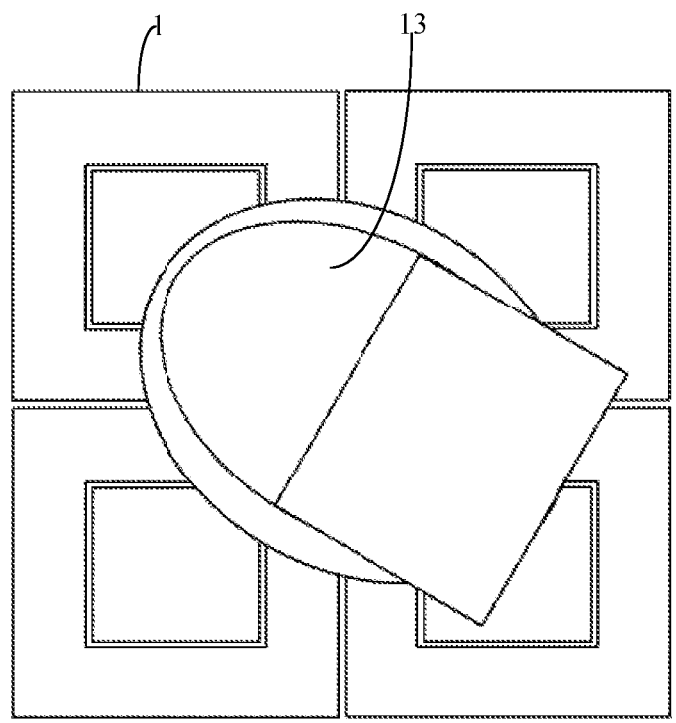
FIG. 3d is a schematic diagram illustrating that a touch position is between four touch control electrode units which are in adjacent rows and in adjacent columns, when a touch panel in an embodiment of the present disclosure is being touched.

4. In a case that the touch control driving circuit detects touch control feedback signals on the sensing electrode in the $(i-1)^{th}$ row and the $(j-1)^{th}$ column ($1 \le i \le m$, $1 \le j \le n$), on the sensing electrode in the $(i-1)^{th}$ row and the $j^{th}$ column ($1 \le i \le m$, $1 \le j \le n$), on the sensing electrode in the $i^{th}$ row and the $(j-1)^{th}$ column ($1 \le i \le m$, $1 \le j \le n$), and on the sensing electrode in the $i^{th}$ row and the $j^{th}$ column ($1 \le i \le m$, $1 \le j \le n$), simultaneously, the touch control position of the finger 13 is between the touch control electrode unit 1 in the $(i-1)^{th}$ row and the touch control electrode unit 1 in the $i^{th}$ row, and between the touch control electrode unit 1 in the $(j-1)^{th}$ column and the touch control electrode unit 1 in the $j^{th}$ column, as shown in FIG. 3d.

By touching the touch control electrode unit(s) 1 in the touch panel as mentioned above, a sensitive and accurate detection of the touch control position of a finger can be achieved, and the touch control sensitivity and accuracy of the touch panel are improved.

It should be also noted that, when the touch panel is being touched, the touch control electrode units 1 in the touch panel may be driven row by row, or column by column, which can also achieve a sensitive and accurate touch control of the touch panel, and the descriptions thereof will not be repeated any more.

Figure 4:
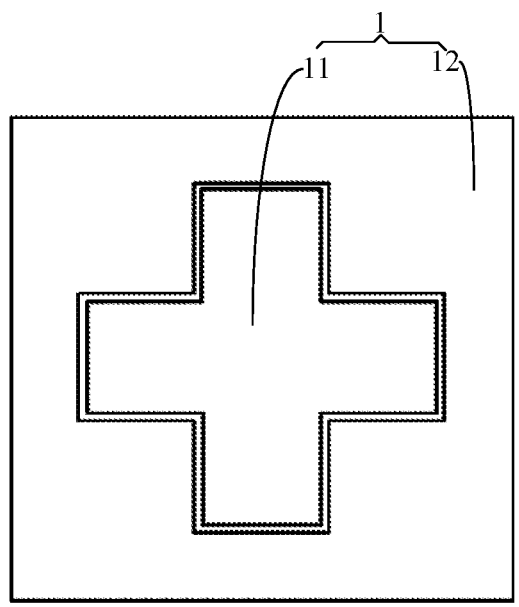
FIG. 4 is a top view of a structure of a touch control electrode unit on a touch panel in an embodiment of the present disclosure.

In the present embodiment, there is provided a touch panel in which, as shown in FIG. 4, the first electrode 11 has a cruciform shape, the second electrode 12 has a ring shape matched with the cruciform shape of the first electrode 11, and an inner ring of the ring shape has a cruciform shape and an outer ring of the ring shape has a rectangular shape.

Other structures of the touch panel in the embodiment (such as the gap width between the first electrode 11 and the second electrode 12) and the driving manner for the touch panel are the same as those described in the above embodiments, and the descriptions thereof will not be repeated here.

In the present embodiment, the shapes of the first electrode 11 and the second electrode 12 and the arrangement in which the second electrode 12 surrounds the first electrode 11 can also improve the sensitivity and the signal to noise ratio of the touch panel, and such a configuration has a simple structure, a simplified process and a convenient manufacturing procedure.

Figure 5:
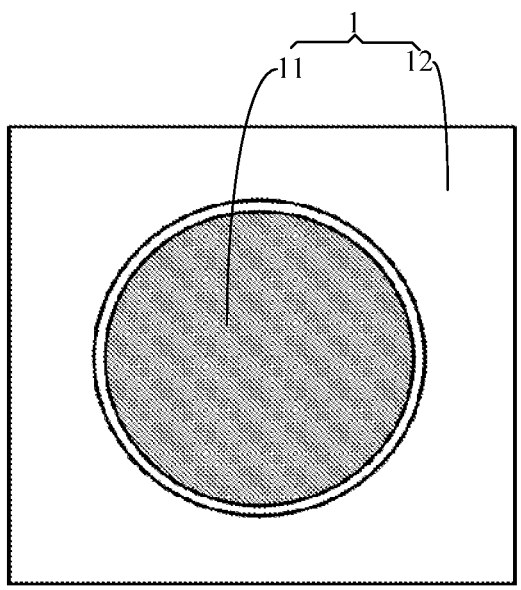
FIG. 5 is a top view of a structure of a touch control electrode unit on a touch panel in an embodiment of the present disclosure.

In the present embodiment, there is provided a touch panel in which, as shown in FIG. 5, the first electrode 11 has a circular shape, the second electrode 12 has a ring shape matched with the circular shape of the first electrode 11, and an inner ring of the ring shape has a circular shape and an outer ring of the ring shape has a rectangular shape.

Other structures of the touch panel in the embodiment (such as the gap width between the first electrode 11 and the second electrode 12) and the driving manner for the touch panel are the same as those described in the above embodiments, and the descriptions thereof will not be repeated here.

In the present embodiment, the shapes of the first electrode 11 and the second electrode 12 and the arrangement in which the second electrode 12 surrounds the first electrode 11 can also improve the sensitivity and the signal to noise ratio of the touch panel.

The above embodiments have the following beneficial effects: in a touch control electrode unit of the touch panel, the second electrode surrounds the first electrode; since the first electrode and the second electrode are provided independently, touch control driving and sensing are performed on the first electrode and the second electrode respectively when the touch panel is being touched; compared with the existing design of a touch panel in which a plurality of driving electrodes are connected to form a driving electrode string and a plurality of sensing electrodes are connected to form a sensing electrode string, the impedance at the time of driving and sensing the first electrodes and the second electrodes in the touch panel is decreased, thereby improving the sensitivity and the signal to noise ratio of the touch panel; furthermore, such a configuration has a simple structure, a simplified process and a convenient manufacturing procedure.

In the present embodiment, there is provided an array substrate which includes the touch panel in any of the above embodiments.

Figure 6:
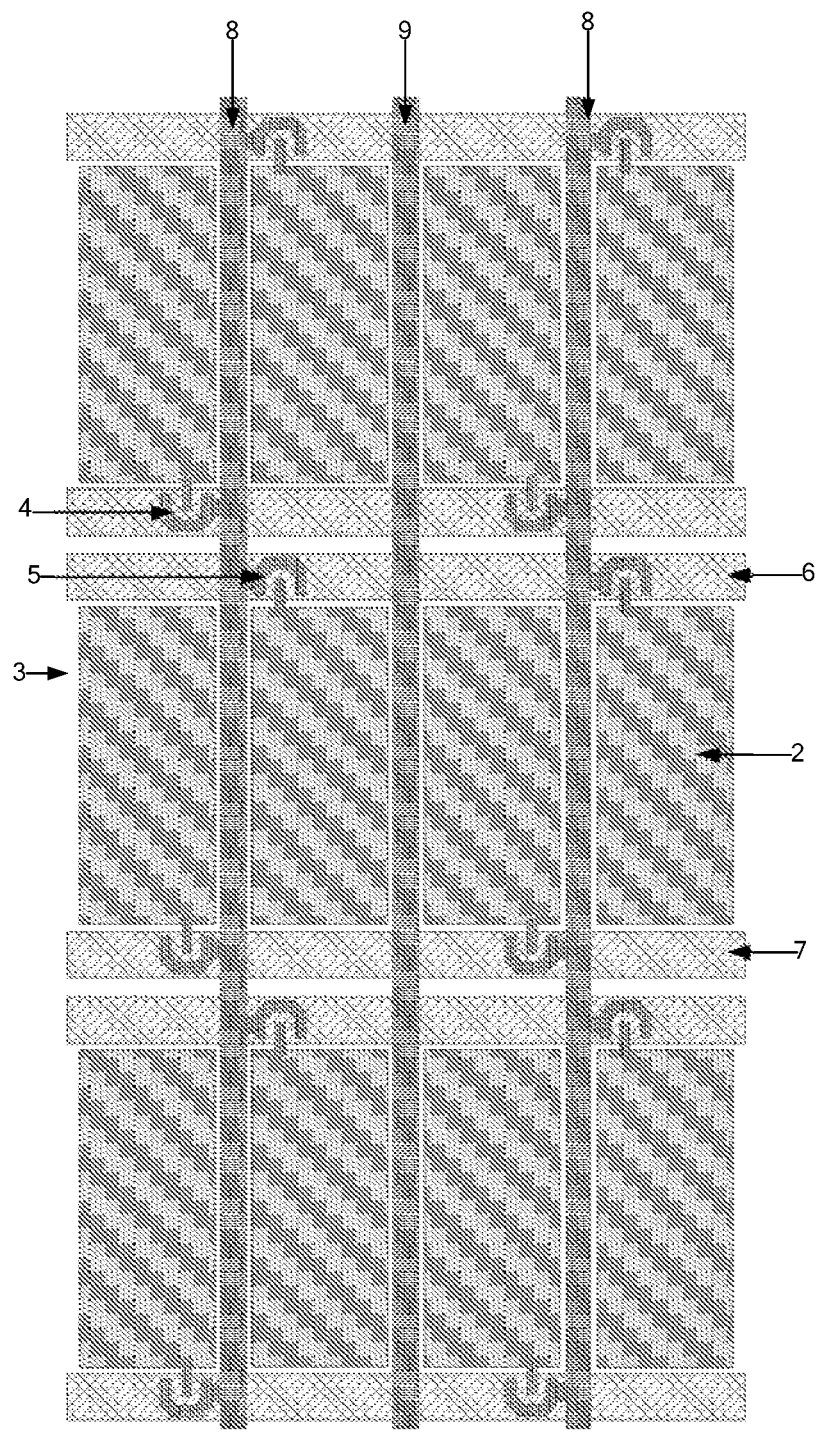
FIG. 6 is a top view of a structure of an array substrate in an embodiment of the present disclosure.
Figure 7:
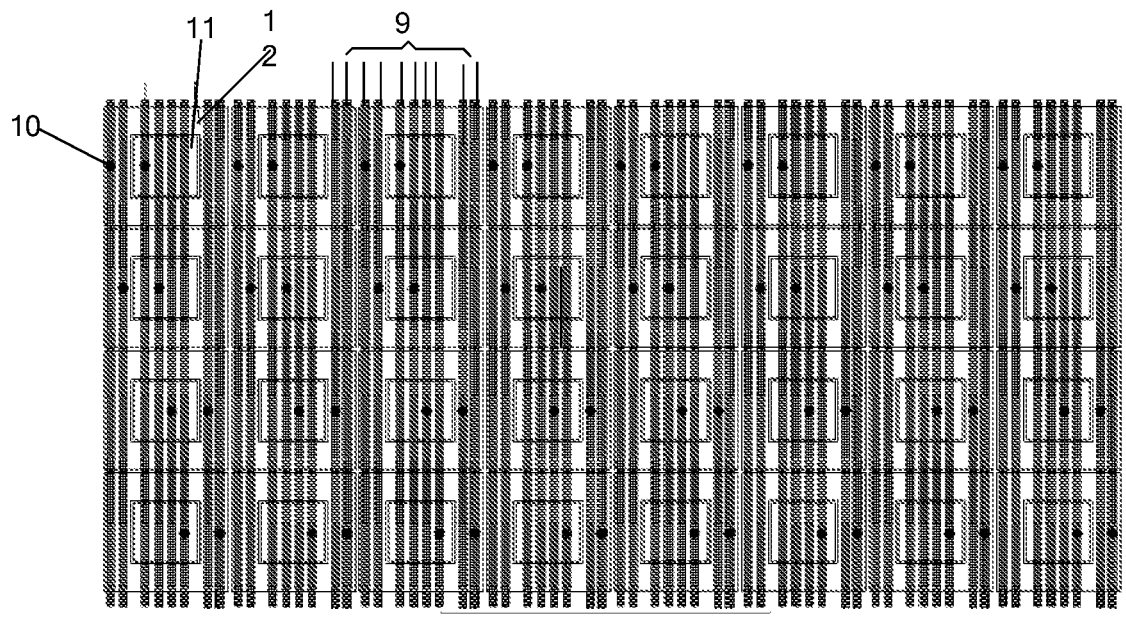
FIG. 7 is a top view illustrating arrangement of touch control electrode units on an array substrate in an embodiment of the present disclosure.

In the present embodiment, as shown in FIGS. 6 and 7, the array substrate further includes pixel electrodes 2 and a common electrode 3, the pixel electrodes 2 are located above the common electrode 3, and the first electrodes 11 and the second electrodes 12 of the touch panel also serve as the common electrode 3. In other words, the first electrodes 11 and the second electrodes 12 serve as the common electrode 3 during display, and serve as the touch control electrodes during touch control; the function switching between the common electrode 3 and the touch control electrodes can be achieved by the time-division driving of display and touch control. In this way, an in-cell touch panel can be achieved, which has a thinner array substrate that can be manufactured with greatly reduced cost.

It should be noted that the pixel electrodes may be located below the common electrode. A pixel electrode or a common electrode which is positioned above is formed as a slit shape.

In the present embodiment, as shown in FIG. 6, the array substrate further includes first switch transistors 4, second switch transistors 5, second gate lines 6, first gate lines 7, data lines 8 and common signal lines 9. The first switch transistors 4 are used for driving the pixel electrodes 2 in odd numbers in one row of pixel electrodes 2 to display, the second switch transistors 5 are used for driving the pixel electrodes 2 in even numbers in one row of pixel electrodes 2 to display; the second gate lines 6 are connected to the gates of the second switch transistors 5; the first gate lines 7 are connected to the gates of the first switch transistors 4; one data line 8 is provided every two columns of pixel electrodes 2, and two adjacent columns of pixel electrodes 2 which are provided with a data line 8 therebetween are connected to this data line 8 through the first switch transistors 4 and the second switch transistors 5 connected respectively thereto. In the array substrate, by driving the pixel electrodes 2 in odd numbers and the pixel electrodes 2 in even numbers in one row of pixel electrodes 2 using two gate lines, respectively, the number of the data lines 8 can be reduced by half, thereby reducing the number of the used data driving chips and in turn reducing the cost.

The specific implementation for reducing the number of the data lines 8 by half is as follows: by increasing the number of the gate lines, the pixel electrodes 2 in adjacent odd-numbered and even-numbered columns share one data line 8, and the pixel electrodes 2 in each row in the odd-numbered column and the even-numbered column are charged in a time-division driving manner. The second gate line 6 is used for driving the pixel electrodes 2 in an even-numbered column; the first gate line 7 is used for driving the pixel electrodes 2 in an odd-numbered column; and each data line 8 is shared by the pixel electrodes 2 in adjacent odd-numbered and even-numbered columns. The first switch transistors 4 are used for controlling the charging and discharging of the pixel electrodes 2 in odd-numbered columns, and the second switch transistors 5 are used for controlling the charging and discharging of the pixel electrodes 2 in even-numbered columns.

As shown in FIGS. 6 and 7, a common signal line 9 is provided between two adjacent columns of pixel electrodes 2 which are not provided with a data line 8 therebetween. The common signal lines 9 and the data lines 8 are formed in a same layer by using a same material, and the common signal lines 9 are connected to the common electrode 3 through vias 10 provided in an insulation layer located between the data lines 8 and the common electrode 3. The common signal lines 9 serve as the common electrode 3 during display, and serve as the driving signal lines and the sensing signal lines of the touch panel during touch control.

In this way, the common signal lines 9 serving as the common electrode 3 during display can increase the storage capacitance between the pixel electrodes 2 and the common electrode 3, and thereby further improve the display effect of the display panel using the array substrate. Furthermore, providing the common signal lines 9 will not add extra manufacturing processes of the array substrate, and the positions thereof will not affect the aperture ratio of the pixels of the array substrate; meanwhile, the common signal lines 9 can also contribute to a high sensitivity and a high signal to noise ratio of the touch control of the touch panel.

In the present embodiment, as shown in FIG. 7, there are a plurality of common signal lines 9. Each of the plurality of first electrodes 11 located in different rows and also serving as the common electrode is connected to a corresponding common signal line 9, respectively; each of the plurality of second electrodes 12 located in different rows and also serving as the common electrode is connected to a corresponding common signal line 9, respectively. That is, each first electrode 11 and each second electrode 12 are connected to corresponding common signal lines 9, respectively. In the touch control stage, such a configuration can lower the requirement for the impedances of the channels connected to the common signal lines 9 in the touch control driving circuit, thereby lowering the requirement for the driving capability of the channels in the touch control driving circuit; in the display stage, providing a plurality of common signal lines 9 can increase the storage capacitance between the pixel electrodes and the common electrode, thereby further improving the display effect of the display panel using the array substrate.

Figure 8:
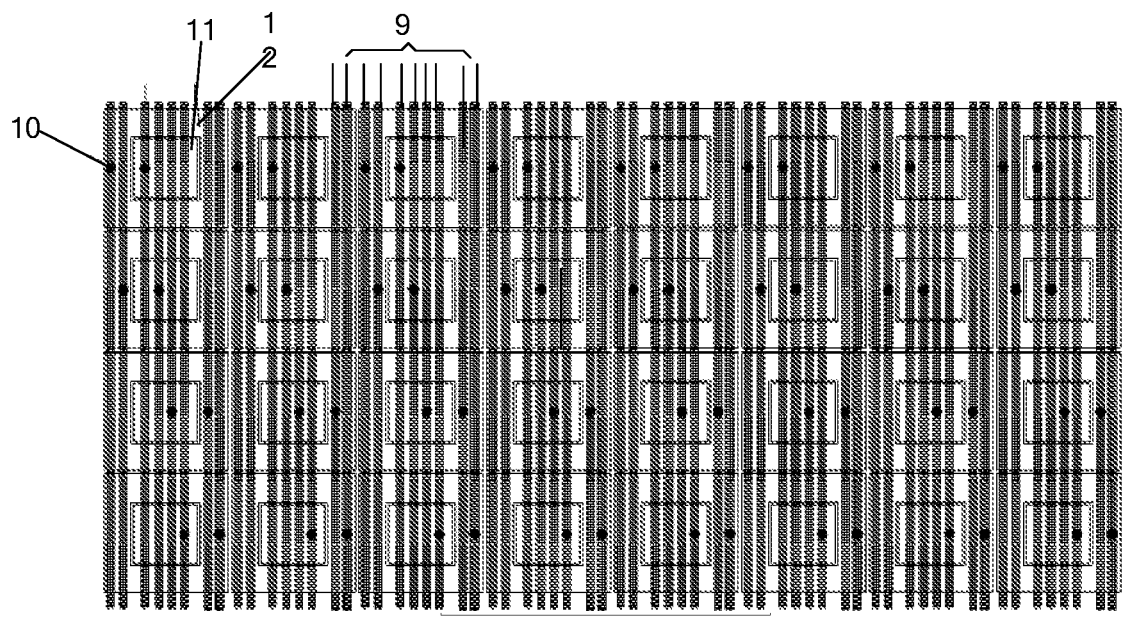
FIG. 8 is a top view illustrating arrangement of touch control electrode units on an array substrate in an embodiment of the present disclosure.

FIG. 8 is a top view illustrating arrangement of the touch control electrode units on the array substrate in an embodiment of the present disclosure. As shown in FIG. 8, the present embodiment provides an array substrate in which there are a plurality of common signal lines 9; each of the plurality of first electrodes 11 located in different rows and also serving as the common electrode is connected to a corresponding common signal line among the plurality of common signal lines connected in parallel, respectively; each of the plurality of second electrodes 12 located in different rows and also serving as the common electrode is connected to a corresponding common signal line among the plurality of common signal lines connected in parallel, respectively.

Since each of the common signal lines connected in parallel is connected to a corresponding first electrode in each row, the resistances of the common signal lines connected to the first electrodes are reduced; since the common signal lines connected in parallel are connected to respective second electrodes in different rows, the resistances of the common signal lines connected to the second electrodes are reduced; in the touch control stage, such a configuration can further lower the requirement for the driving capability of the channels connected to the common signal lines in the touch control driving circuit, thereby further lowering the requirement for the impedances of the channels in the touch control driving circuit; in the display stage, the plurality of common signal lines which are connected in parallel can further increase the storage capacitance between the pixel electrodes and the common electrode, thereby further improving the display effect of the display panel using the array substrate.

It should be noted that the number of the common signal lines connected in parallel may be determined according to the numbers of the first electrodes and the second electrodes in the array substrate so as to ensure that each first electrode and each second electrode are connected separately to a common signal line.

Other structures of the array substrate in the present embodiment are the same as those described in the above embodiments, and the descriptions thereof will not be repeated here.

With the touch panel in any of the above embodiments, the array substrate provided by the embodiment can not only achieve a sensitive touch control and a high signal to noise ratio during touch control, but also achieve an in-cell touch control, which reduces the whole thickness of the array substrate, reduces greatly the manufacturing cost of the array substrate, and does not affect the aperture ratio of the pixels of the array substrate at the same time.

The present embodiment provides a display device which includes the array substrate according to the above embodiment.

With such an array substrate, the touch control sensitivity and the signal to noise ratio during touch control of the display device are improved.

The display device provided by the present disclosure may be any product or component having touch control and display functions, such as a mobile phone, a navigator, and so on.

It will be appreciated that the above implementations are exemplary implementations simply for illustrating the principle of the present disclosure. However, the present disclosure is not limited thereto. An ordinary person skilled in the art may make various modifications and variations without departing from the spirit and scope of the present disclosure. The present disclosure is intended to encompass these modifications and variations.

What is claimed is:

1. An array substrate, comprising:
    a touch panel, comprising a touch control electrode unit, the touch control electrode unit comprising a first electrode and a second electrode which are insulated from each other, and the second electrode surrounding the first electrode;
    a common electrode;
    pixel electrodes, located above or below the common electrode;
    a first switch transistor, configured to drive a pixel electrode in an odd column in a row of pixel electrodes to display;
    a second switch transistor, configured to drive a pixel electrode in an even column in the row of pixel electrodes to display;
    a first gate line, connected to a gate of the first switch transistor; and
    a second gate line, connected to a gate of the second switch transistor;
    wherein one data line is provided every two columns of pixel electrodes, two adjacent columns of pixel electrodes which are provided with a data line therebetween are connected to the data line through the first switch transistor and the second switch transistor connected respectively to the two adjacent columns of pixel electrodes;
    a common signal line is provided between two adjacent columns of pixel electrodes which are not provided with a data line therebetween, the common signal line and the data line are formed in a same layer by using a same material, and the common signal line is connected to the common electrode through a via provided in an insulation layer located between the data line and the common electrode;

the common signal line serves as the common electrode during display, and serves as a driving signal line and a sensing signal line of the touch panel during touch control; and the first electrode and the second electrode of the touch panel serve as the common electrode, the first electrode has a square shape, the second electrode has a square annular shape, and distances between four sides of an inner ring and corresponding four sides of an outer ring of the second electrode in the square annular shape are equal to each other; a side length of the first electrode in the square shape is two times of a ring width of the second electrode in the square annular shape, and a gap between the first electrode and the second electrode is in a range from 3 μm to 5 μm.

2. The array substrate of claim 1, wherein the array substrate comprises a plurality of common signal lines, each of a plurality of first electrodes located in different rows and also serving as the common electrode is connected to a corresponding common signal line; and each of a plurality of second electrodes located in different rows and also serving as the common electrode is connected to a corresponding common signal line.

3. The array substrate of claim 1, wherein the array substrate comprises a plurality of common signal lines, each of a plurality of first electrodes located in different rows and also serving as the common electrode is connected to a corresponding common signal line among the plurality of common signal lines connected in parallel; and each of a plurality of second electrodes located in different rows and also serving as the common electrode is connected to a corresponding common signal line among the plurality of common signal lines connected in parallel.

4. A display device, comprising the array substrate of claim 1.

5. A display device, comprising the array substrate of claim 2.

6. A display device, comprising the array substrate of claim 3.

* * * * *